United States Patent
Song et al.

(10) Patent No.: US 9,503,725 B2
(45) Date of Patent: Nov. 22, 2016

(54) METHOD AND APPARATUS FOR ENCODING/DECODING IMAGE FOR PERFORMING INTRAPREDICTION USING PIXEL VALUE FILTERED ACCORDING TO PREDICTION MODE

(75) Inventors: Jinhan Song, Seoul (KR); Jeongyeon Lim, Gyeonggi-do (KR); Kibaek Kim, Seoul (KR); Jechang Jeong, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 728 days.

(21) Appl. No.: 13/883,519

(22) PCT Filed: Nov. 4, 2011

(86) PCT No.: PCT/KR2011/008384
§ 371 (c)(1),
(2), (4) Date: Jul. 10, 2013

(87) PCT Pub. No.: WO2012/060663
PCT Pub. Date: May 10, 2012

(65) Prior Publication Data
US 2013/0301714 A1 Nov. 14, 2013

(30) Foreign Application Priority Data

Nov. 4, 2010 (KR) .................. 10-2010-0109247
Apr. 14, 2011 (KR) .................. 10-2011-0034578

(51) Int. Cl.
H04N 7/50 (2006.01)
H04N 7/32 (2006.01)
(Continued)

(52) U.S. Cl.
CPC ...... *H04N 19/00781* (2013.01); *H04N 19/117* (2014.11); *H04N 19/159* (2014.11); *H04N 19/176* (2014.11); *H04N 19/593* (2014.11)

(58) Field of Classification Search
None
See application file for complete search history.

(56) References Cited

U.S. PATENT DOCUMENTS 5,532,484 A * 7/1996 Sweetser ............... H04N 5/367
250/332
6,535,558 B1 * 3/2003 Suzuki ................. H04N 19/105
375/240.12
(Continued)

FOREIGN PATENT DOCUMENTS

| KR | 1020060129096 | 12/2006 |
| KR | 1020090095014 | 9/2009 |
| KR | 1020100045007 | 5/2010 |

OTHER PUBLICATIONS

International Search Report mailed May 1, 2012 for PCT/KR2011/008384.

*Primary Examiner* — Frederick Bailey
(74) *Attorney, Agent, or Firm* — Hauptman Ham, LLP

(57) ABSTRACT

A video encoding apparatus, a video decoding apparatus and video decoding method are provided. The video decoding apparatus includes:
a decoding unit receiving encoded data and reconstruct an intra prediction mode by decoding a bitstream of the encoded data; a dequantization unit dequantizing the quantized transformed residual block to reconstruct a transformed residual block; an inverse transform unit inversely transforming the transformed residual block to reconstruct a residual block; a prediction unit generating a predicted block by selectively using one of pixels of a neighboring block adjacent to a current block and a reference pixel generated by filtering the pixels of the neighboring block according to the intra prediction mode;

(Continued)

and an addition unit adding the reconstructed residual block and the predicted block to reconstruct the current block.

9 Claims, 9 Drawing Sheets

(51) Int. Cl.
*H04N 19/61* (2014.01)
*H04N 19/159* (2014.01)
*H04N 19/176* (2014.01)
*H04N 19/593* (2014.01)
*H04N 19/117* (2014.01)

(56) References Cited

U.S. PATENT DOCUMENTS

| | | | | |
|---|---|---|---|---|
| 9,001,890 B2* | 4/2015 | Song | ............... | H04N 19/147 375/240.12 |
| 2003/0223495 A1* | 12/2003 | Sun | ............... | H04N 19/197 375/240.12 |
| 2006/0072676 A1* | 4/2006 | Gomila | ............... | H04N 19/61 375/240.27 |
| 2009/0219993 A1* | 9/2009 | Bronstein | ............... | H04N 19/61 375/240.03 |
| 2010/0278266 A1* | 11/2010 | Daian | ............... | H04N 19/176 375/240.15 |
| 2010/0284471 A1* | 11/2010 | Tsai | ............... | H04N 19/70 375/240.24 |
| 2011/0038415 A1* | 2/2011 | Min | ............... | H04N 19/115 375/240.12 |

* cited by examiner

METHOD AND APPARATUS FOR ENCODING/DECODING IMAGE FOR PERFORMING INTRAPREDICTION USING PIXEL VALUE FILTERED ACCORDING TO PREDICTION MODE

CROSS-REFERENCE TO RELATED APPLICATION

The present application is a national phase of International Patent Application No. PCT/KR2011/008384, filed Nov. 4, 2011, which is based on and claims priorities to Korean Patent Application No. 10-2010-0109247, filed on Nov. 4, 2010 and Korean Patent Application No. 10-2011-0034578, filed Apr. 14, 2011. The disclosures of the above-listed applications are hereby incorporated by reference herein in their entirety.

FIELD

The present disclosure relates to a video encoding/decoding method and apparatus for generating a predicted pixel or block by using a reference pixel generated by applying a filter to pixels of a neighboring block in consideration of direction of a prediction mode for prediction of a current block.

BACKGROUND

The statements in this section merely provide background information related to the present disclosure and may not constitute prior art.

Moving Picture Experts Group (MPEG) and Video Coding Experts Group (VCEG) have developed an improved and excellent video compression technology, compared to existing MPEG-4 Part 2 and H.263 standards. The new standard is called H.264/AVC (Advanced Video Coding) and was released jointly as MPEG-4 Part 10 AVC and ITU-T Recommendation H.264. The H.264/AVC (hereinafter referred to as 'H.264') uses a spatial predictive coding method, which is different from known international video coding standards such as MPEG-1, MPEG-2, MPEG-4 Part2 Visual and the like. Known video coding methods use "intra prediction" for coefficients transformed in discrete cosine transform (DCT) domain to seek higher encoding efficiency, resulting in degradation of the subjective video quality at low band transmission bit rates.

However, the inventor(s) has noted that H.264 adopts an encoding method based on a spatial intra prediction in a spatial domain rather than in a transform domain. An encoder using an encoding method based on the known spatial intra prediction predicts a block to be currently encoded based on information about a previous block that has been encoded and reproduced, and encodes only information about difference from an actual block to be encoded to transmit the encoded information to a decoder. In this case, to be able to predict the block, the decoder is provided with a transmission of parameters necessary for block prediction, or it shares parameters necessary for prediction through synchronization with the encoder. The decoder generates and reproduces a desired block to be currently decoded by predicting a target block using a decoded neighboring block and adding difference information transmitted from the encoder to the predicted target block. If parameters necessary for prediction have been transmitted from the encoder, the decoder uses the parameters to predict the target block.

The inventor(s) has, however, noted that when prediction is performed by using intra prediction according to a known video encoding method or video decoding method, pixels of a target block are predicted by using reconstructed adjacent pixels located in a neighboring block (mainly, the left and upper blocks of the target block) adjacent to the block to be currently encoded. In a case where the prediction is performed using existing adjacent pixels because many quantization errors exist or complexity is high in a certain region according to characteristics of images, the inventor(s) has experienced that there may exist a region where the prediction is not well performed. The inventor(s) has noted that in such a region, prediction may not be well performed with a known intra encoding. The inventor(s) has experienced that the reduced prediction accuracy increases a difference between a pixel value of an original pixel and a predicted pixel value, lowering compression efficiency.

SUMMARY

In accordance with some embodiments of the present disclosure, a video encoding apparatus comprises a prediction unit, a subtraction unit, a transform unit, a quantization unit, and an encoding unit. The prediction unit is configured to generate a predicted block of a current block by selectively using one of pixels of a neighboring block of the current block and a reference pixel generated by filtering the pixels of the neighboring block according to an intra prediction mode of the current block. The subtraction unit is configured to generate a residual block by subtracting the predicted block from the current block. The transform unit is configured to transform the residual block. The quantization unit is configured to quantize the transformed residual block to generate the quantized residual block. And the encoding unit is configured to encode the quantized transformed residual block.

In accordance with some embodiments of the present disclosure, a video decoding apparatus comprises a decoding unit, a dequantization unit, an inverse transform unit, a prediction unit, and an addition unit. The decoding unit is configured to receive encoded data and reconstruct an intra prediction mode by decoding a bitstream of encoded data and a residual block. The dequantization unit is configured to dequantize a quantized transformed residual block included in the decoded bitstream to reconstruct a transformed residual block. The inverse transform unit is configured to inversely transform the dequantized transformed residual block to reconstruct a residual block. The prediction unit is configured to generate a predicted block of a current lock by selectively using one of pixels of a neighboring block adjacent to the current block and a reference pixel generated by filtering the pixels of the neighboring block according to the intra prediction mode. And the addition unit is configured to add the reconstructed residual block and the predicted block to reconstruct the current block.

In accordance with some embodiments of the present disclosure, a video decoding apparatus is configured to receive encoded data and reconstructing an intra prediction mode and a residual block; dequantize a quantized transformed residual block to reconstruct a transformed residual block the residual block; inversely transform the dequantized transformed residual block to reconstruct a residual block; generate a predicted block of a current block by selectively using one of pixels of a neighboring block adjacent to the current block and a reference pixel generated by filtering the pixels of the neighboring block according to the intra prediction mode; and reconstruct the current block by adding the reconstructed residual block to the predicted block.

DETAILED DESCRIPTION

Figure 1:
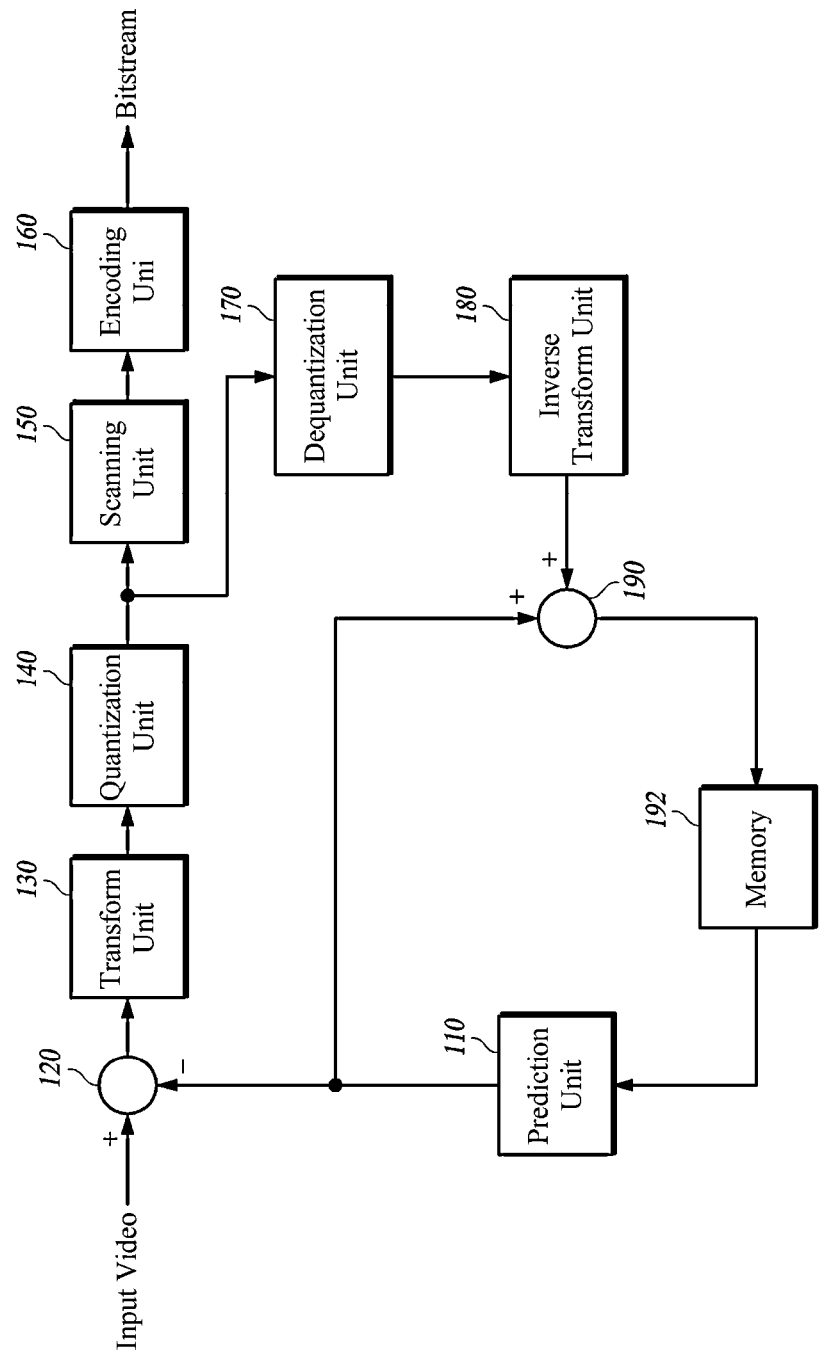
FIG. 1 is a schematic block diagram of a video encoding apparatus.

The present disclosure is directed to improve compression performance by performing prediction by using a reference pixel generated by applying a filter to pixels of a neighboring block according to a direction of a prediction mode, when a target block is predicted upon intra prediction.

A video encoding apparatus and/or a video decoding apparatus according to one or more embodiments may correspond to a user terminal such as a PC (personal computer), notebook computer, PDA (personal digital assistant), PMP (portable multimedia player), PSP (PlayStation Portable), wireless communication terminal, smart phone, TV, and the like. A video encoding apparatus and/or a video decoding apparatus according to one or more embodiments may correspond to a user terminal or a server terminal such as an application server, service server and the like. A video encoding apparatus and/or a video decoding apparatus according to one or more embodiments may correspond to various apparatuses each including (a) a communication apparatus such as a communication modem and the like for performing communication with various types of devices or wired/wireless communication networks, (b) a memory for storing various programs and data that encode or decode a video or perform an inter/intra-prediction for encoding or decoding, and (c) a microprocessor to execute a program so as to perform calculation and controlling, and the like.

Further, a video encoded into a bitstream by the video encoding apparatus may be transmitted in real time or non-real-time to the video decoding apparatus through wired/wireless communication networks such as the Internet, wireless personal area network (WPAN), wireless local area network (WLAN), WiBro (wireless broadband, aka WiMax) network, mobile communication network and the like or through various communication interfaces such as a cable, a universal serial bus (USB) and the like. According to one or more embodiments, the bitstream may be decoded in the video decoding apparatus and may be reconstructed to a video, and the video may be played back.

In general, a video may be formed of a series of pictures (also referred to herein as "images" or "frames"), and each picture is divided into predetermined regions such as blocks. The divided blocks may be classified into an intra block or an inter block depending on an encoding scheme. The intra-block refers to a block that is encoded based on an intra-prediction coding scheme. The intra-prediction coding scheme predicts pixels of a current block by using pixels of blocks that were encoded and decoded to be reconstructed in a current picture to which encoding is to be performed, so as to generate a predicted block, and encodes a differential value between pixels of the predicted block and pixels of the current block. The inter-block means a block that is encoded based on an inter-prediction coding scheme. The inter-prediction encoding scheme predicts a current block in a current picture referring to at least one previous picture and/or at least one subsequent picture, so as to generate a predicted block, and encodes a differential value between pixels of the predicted block and pixels of the current block. Here, a frame that is referred to in encoding or decoding the current picture (i.e., current frame) is called a reference frame.

FIG. 1 is a schematic block diagram of an example of a video encoding apparatus.

The video encoding apparatus 100 may include a prediction unit 110, a subtraction unit 120, a transform unit 130, a quantization unit 140, a scanning unit 150, an encoding unit 160, a dequantization unit 170, an inverse transform unit 180, an addition unit 190 and a memory 192.

An input image to be encoded is input block-wise. In the present disclosure, a block has an M×N form. M and N may have various values, and M and N may be equal to or different from each other.

The prediction unit 110 generates a predicted block by predicting a target block to be currently encoded in an image. That is, the prediction unit 110 predicts a pixel value of each pixel of the block to be encoded in the image according to a selected optimal prediction mode, and generates the predicted block having the predicted pixel value of each predicted pixel. In addition, the prediction unit 110 transmits information about the prediction mode to the encoding unit 160 so as to enable the encoding unit 160 to encode the information about the prediction mode. The optimal prediction mode may be a prediction mode having the lowest encoding cost among various intra prediction modes for intra prediction (for example, in H.264/AVC, nine prediction modes for each of intra 8×8 prediction and intra 4×4 prediction and four prediction modes for intra 16×16 prediction).

Figure 2:
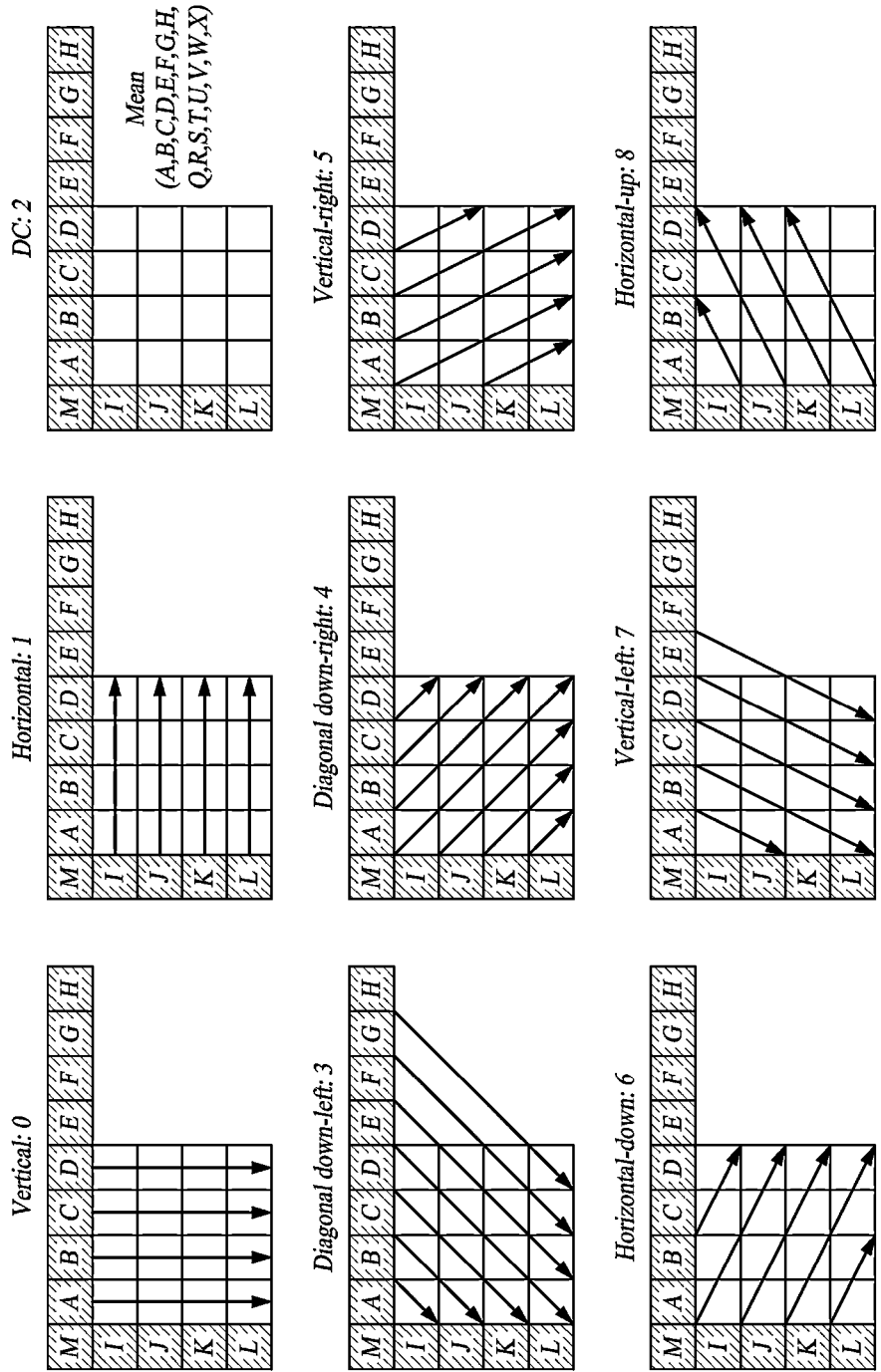
FIG. 2 is an exemplary diagram of intra prediction modes in H.264/AVC.
Figure 3:
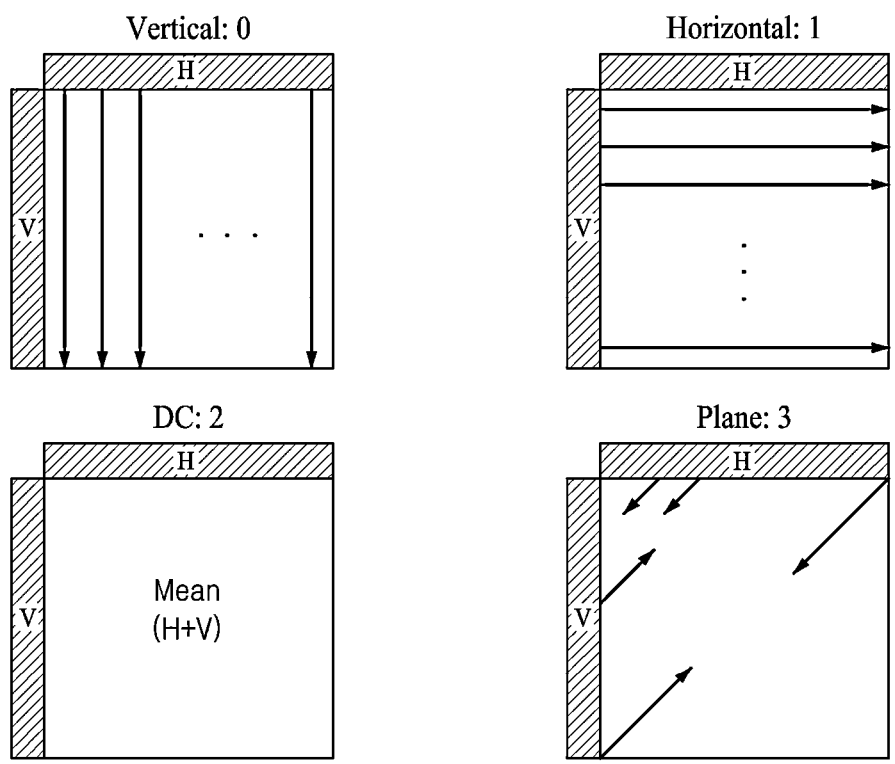
FIG. 3 is another exemplary diagram of intra prediction modes in H.264/AVC.

FIG. 2 is an exemplary diagram of intra prediction modes in H.264/AVC. FIG. 3 is another exemplary diagram of intra prediction modes in H.264/AVC. Referring to FIG. 2, in the case of the intra 4×4 prediction, there are nine prediction modes including a vertical mode, a horizontal mode, a direct current (DC) mode, a diagonal down-left mode, a diagonal down-right mode, a vertical-right mode, a horizontal-down mode, a vertical-left mode, and a horizontal-up mode. In addition, in the case of the intra 8×8 prediction, there are nine prediction modes like the intra 4×4 prediction. In addition, referring to FIG. 3, in the intra 16×16 prediction, there are four prediction modes including a vertical mode, a horizontal mode, a direct current (DC) mode and a plane mode. The prediction unit 110 may calculate the encoding costs of the respective prediction modes according to the block mode or block size of the target block, and determine a prediction mode having the lowest encoding cost as the optimal prediction mode.

The subtraction unit 120 generates a residual block by subtracting the predicted block from the target block to be encoded (that is, the current block in an image of input video). That is, the subtraction unit 120 generates the residual block that is a block-form residual signal by calculating a difference between the pixel value of each pixel of the target block to be encoded and the predicted pixel value of each pixel of the predicted block predicted by the prediction unit 110.

The transform unit 130 transforms each pixel value of the residual block with each corresponding frequency coefficient by transforming the residual block with a frequency domain. In this case, the transform unit 130 can transform the residual signal into the frequency domain by using various transform methods for transforming an image signal of a spatial domain into in an image signal of a frequency domain, such as Hadamard transform, discrete cosine transform (DCT) based transform, and the like. In this case, the residual signal transformed with the frequency domain becomes the frequency coefficient.

The quantization unit 140 quantizes said each corresponding frequency coefficient of the residual block (hereinafter, referred to as "a frequency coefficient block") transformed with the frequency domain by the transform unit 130. In this case, the quantization unit 140 may quantize the transformed frequency coefficient block (i.e., quantize frequency coefficients of the frequency coefficient block transformed from the residual block) by using a dead zone uniform threshold quantization (hereinafter, referred to as "DZUTQ"), a quantization weighted matrix, or an improved quantization method thereof.

The scanning unit 150 generates a quantized frequency coefficient string by scanning the quantized frequency coefficients of the transformed residual block quantized by the quantization unit 140 in accordance with various scanning methods such as a zigzag scan.

The encoding unit 160 outputs a bitstream by encoding the quantized frequency coefficient string generated by the scanning unit 150 by using an entropy encoding scheme or the like. The entropy coding is a scheme that encodes a given set of symbols with the minimum number of bits to represent them. In addition, the encoding unit 160 may encode information about the prediction mode by which the target block is predicted by the prediction unit 110. On the other hand, the function of the scanning unit 150 may be integrated into the encoding unit 160.

As such encoding technology, an entropy encoding technique may be used, but the present disclosure is not necessarily limited thereto, and various encoding techniques may also be used.

In addition, the encoding unit 160 can include not only the bit string generated by encoding the quantized frequency coefficients but also various pieces of information required to decode the encoded bit string in the encoded data. That is, the encoded data may include a coded block pattern (CBP), a delta quantization parameter, a bit string generated by encoding the quantized frequency coefficients, a bit sting for information necessary for prediction (for example, intra prediction mode in the case of intra prediction or motion vectors in the case of inter prediction), and the like.

The dequantization unit 170 dequantizes the frequency coefficient block quantized by the quantization unit 140. That is, the dequantization unit 170 generates the frequency coefficient block by dequantizing the quantized frequency coefficients of the quantized frequency coefficient block.

The inverse transform unit 180 inversely transforms the frequency coefficient block dequantized by the dequantization unit 170. That is, the inverse transform unit 180 generates (or reconstructs) the residual block having pixel values, that is, the reconstructed residual block by inversely transforming the frequency coefficients of the dequantized frequency coefficient block. In this case, the inverse transform unit 180 performs inverse transform by inversely using the transform method used by the transform unit 130.

The addition unit 190 reconstructs the target block by adding the predicted block predicted (or generated) by the prediction unit 110 to the residual block reconstructed by the inverse transform unit 180. The reconstructed target block is stored in the memory 192, and may be used as a reference picture when a next block of the target block or other blocks are encoded.

Although not shown in FIG. 1, a deblocking filter unit (not shown) may be further connected between the memory 192 and the addition unit 190. The deblocking filter unit performs deblocking filtering on the target block reconstructed by the addition unit 190. Here, the deblocking filtering refers to an operation for reducing block distortion occurring during the encoding of the video block-wise. The deblocking filter may be applied to a block boundary and a macroblock boundary, may be applied only to a macroblock boundary, or may not be used.

Figure 4:
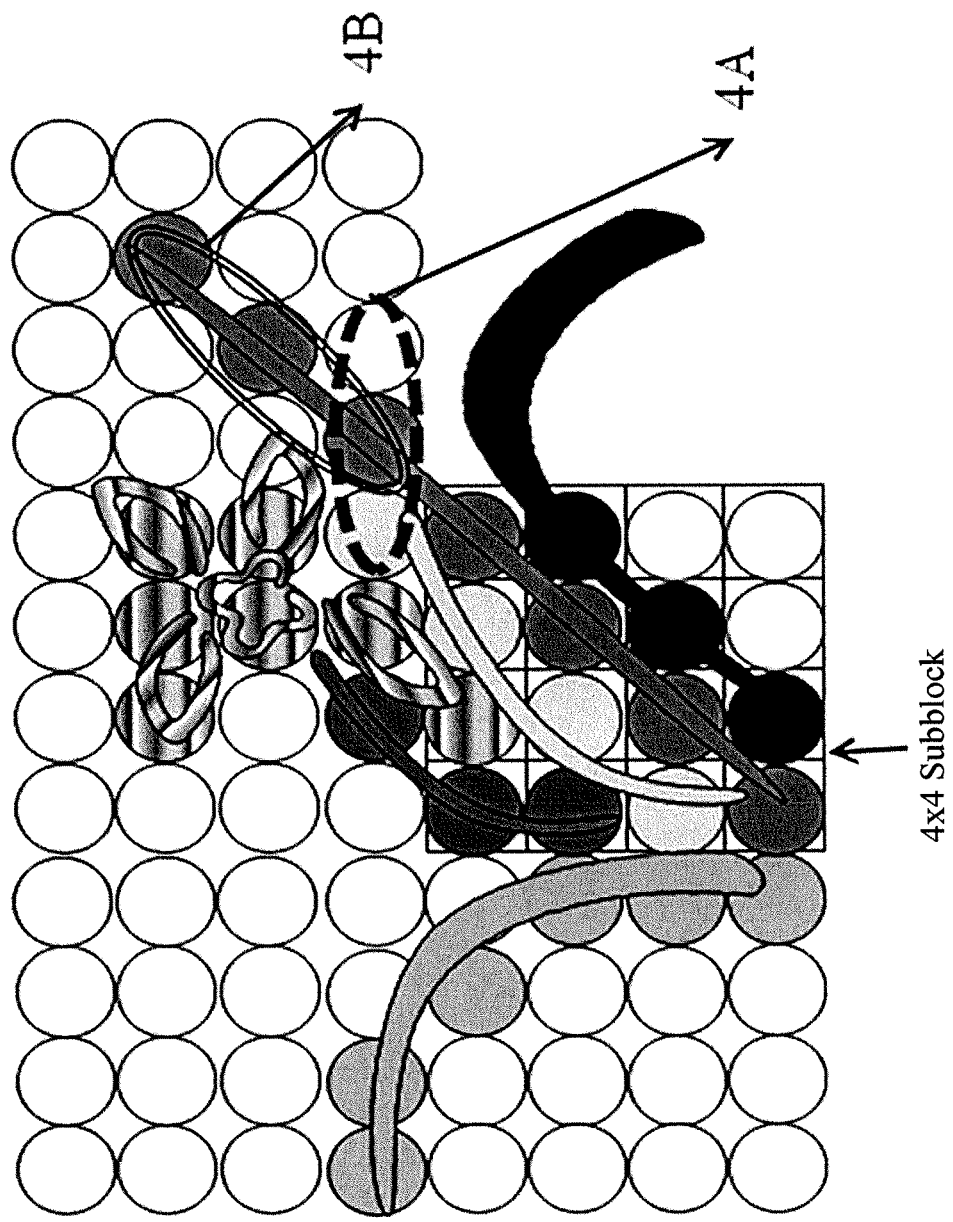
FIG. 4 is an exemplary diagram of a case where quantization error exists.

FIG. 4 is an exemplary diagram of a case where quantization error exists.

When predicting the target block to be currently encoded, the prediction unit 110 may generate a predicted block by using pixels of a neighboring block according to a prediction mode. Since it is likely that the pixel of the neighboring block located at a boundary of the target block will be correlated with pixels of the target block, the target block can be predicted by using the pixels located at the boundary of the encoded neighboring block. As indicated by 4A in FIG. 4, when the target block is predicted by using the pixel of the neighboring block located at the boundary of the target block in a general region of an image, the target block is predicted accurately if a prediction mode is well selected according to the characteristic of a relevant block.

However, when complexity is high in a particular region of an image and a lot of quantization error exists in the pixel of the neighboring block located at the boundary of the target block, it is difficult to accurately predict the pixel of the target block, which lowers prediction accuracy. The block shown in FIG. 4 has a direction of a diagonal down-left mode. In a case where a current block is predicted by using pixels located at the center of 4A in FIG. 4 in the direction of the diagonal down-left mode, when a lot of quantization error exist in the pixel located at the center of 4A in FIG. 4, it is difficult to efficiently predict the current block. In order to reduce the quantization error, the current block may be predicted by using pixels generated by applying a low pass filter. It is possible to reduce the quantization error by using the low pass filter with three pixels located at 4A of FIG. 4, or the pixels of 4B of FIG. 4. However, in FIG. 4, it may be more efficient to reduce the quantization error by using the pixels located at 4B rather than using the pixels located at 4A. Since correlation between the pixels located at 4A is low, the pixels located at 4A are not efficient to reduce quantization error. In this case, it may be more efficient to reduce the quantization error with the pixels of 4B of FIG. 4.

That is, in a case where prediction is performed by using pixels of the neighboring block located at a boundary of the target block in a general region of an image, when the prediction mode is well selected according to the characteristic of a relevant block, a residual signal having a predesignated difference value is generated, leading to reduction in the data size of the bitstream. However, in a case where complexity is high in a certain region or a lot of quantization error exists in the pixel of the neighboring block located at the boundary of the target block, prediction is not well performed even when the prediction mode is well selected according to the characteristic of the relevant block, which increases the data amount of the encoded bitstream and in turn degrades compression efficiency. As a result, in such a case, encoding may be efficiency performed by generating pixels of the neighboring block generated through a special process rather than the known pixel of the neighboring block.

At least one embodiment of the present disclosure provides video encoding/decoding method and apparatus for efficiently performing prediction and encoding when prediction performance is not satisfied because the target block is a complex region or a lot of quantization error exists in the pixel of the neighboring block.

Herein, an arbitrary size of a block may be set to N×M by a user, and an arbitrary size of a subblock in a block having an arbitrary size is also set to Q×P (where Q=N and P=M) by the user.

FIG. 4 shows a case where the block to be currently encoded is a 16×16 block, and the subblock is a 4×4. At least one embodiment of the present disclosure will be described below with reference to the shown example. On the other hand, the size of the block, the size of the subblock or the like are merely exemplary, and various block sizes may be used.

Figure 5:
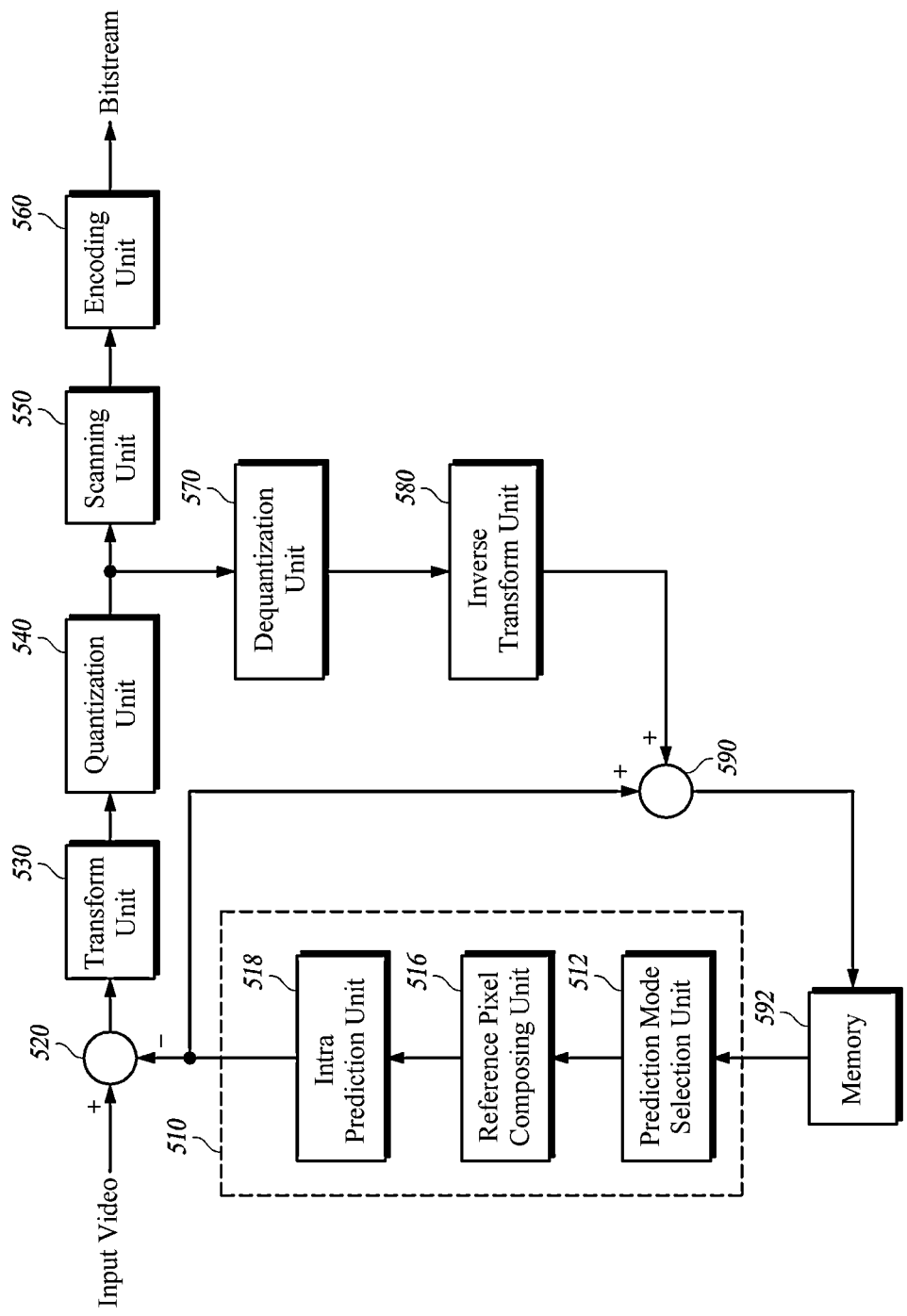
FIG. 5 is a schematic diagram of a video encoding apparatus according to at least one embodiment of the present disclosure.

FIG. 5 is a schematic diagram of a video encoding apparatus according to at least one embodiment of the present disclosure.

The video encoding apparatus 500 according to at least one embodiment of the present disclosure may include a prediction unit 510, a subtraction unit 520, a transform unit 530, a quantization unit 540, a scanning unit 550, an encoding unit 560, a dequantization unit 570, an inverse transform unit 580, an addition unit 590, and a memory 592.

Since the operations of the subtraction unit 520, the transform unit 530, the quantization unit 540, the scanning unit 550, the encoding unit 560, the dequantization unit 570, the inverse transform unit 580, the addition unit 590 and the memory 592 performs the functions identical or similar to those of the subtraction unit 120, the transform unit 130, the quantization unit 140, the scanning unit 150, the encoding unit 160, the dequantization unit 170, the inverse transform unit 180, the addition unit 190 and the memory 192 which have been described with reference to FIG. 1, detailed descriptions thereof will be omitted.

Meanwhile, the prediction unit 510 may generate a predicted block by selectively using a reference pixel generated by filtering pixels of a neighboring block adjacent to a current block or the pixels of the neighboring block according to the intra prediction mode of the current block. The prediction unit 510 includes a prediction mode selection unit 512, a reference pixel composing unit 516, and an intra prediction unit 518.

The prediction mode selection unit 512 selects an optimal prediction mode by comparing the encoding costs of respective prediction modes including an intra prediction mode which uses a adjacent pixel of the target block as the reference pixel and an intra prediction mode which uses a reference pixel generated by filtering adjacent pixels in consideration of the direction of the intra prediction mode, with respect to intra prediction modes (for example, H.264/AVC shown in FIGS. 2 and 3, nine prediction modes or four intra prediction modes) according to the block mode or block size of the target block (that is, current block).

The reference pixel composing unit 516 generates the reference pixel by using only a pixel located at a boundary of the target block according to the intra prediction mode that is selected and transmitted by the prediction mode selection unit 512, or generates the reference pixel for intra prediction by using the pixel generated by filtering the adjacent pixels.

Herein, filtering is performed on pixels located at the pixels of the neighboring block according to the direction of the prediction mode of the current block to generate a new pixel. Since the pixels of the neighboring block which are placed in the direction of the prediction mode are likely to have high correlation in the direction, the value of the pixel generated when the filtering is performed are likely to be a representative of pixels in the direction of the prediction mode of the target block, leading to accuracy prediction.

Figure 6:
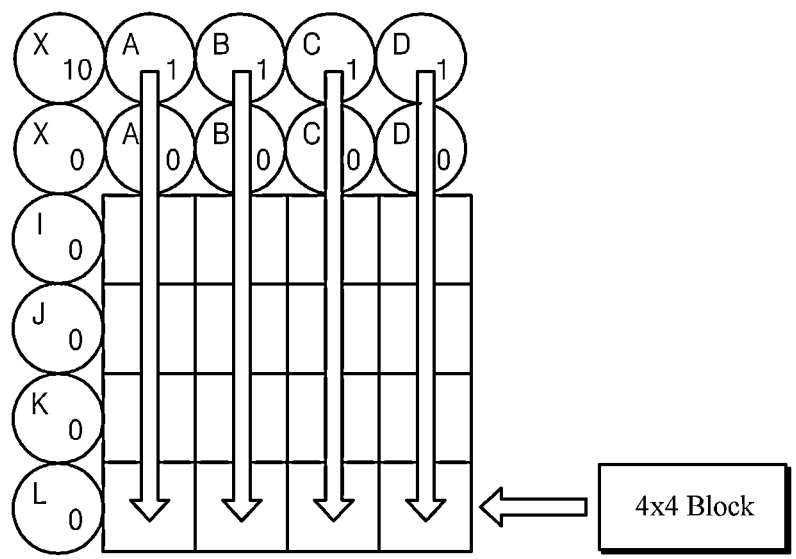
FIG. 6 is an exemplary diagram of a case of generating a new pixel by performing filtering according to a direction of a prediction mode of a current block according to at least one embodiment of the present disclosure.

FIG. 6 is an exemplary diagram of a case of generating a new pixel by performing filtering according to the direction of the prediction mode of the current block. FIG. 6 shows an example in which a target block is a 4×4 block and the prediction mode is a vertical mode. The prediction is performed according to a prediction mode selected by using pixels adjacent to the boundary of the target block (that is, the prediction is performed by using $A_0$, $B_0$, $C_0$ and $D_0$ in the vertical mode). On the other hand, in FIG. 6, the prediction is performed by using pixels generated by filtering the pixels of the neighboring block according to the direction of the prediction mode.

When the prediction mode selected by the prediction mode selection unit 512 represents that the prediction is performed by using only the pixel located at the boundary of the target block, the reference pixel composing unit 516 generates the reference pixel by using the pixel located at the boundary of the target block. In addition, when the prediction mode selected by the prediction mode selection unit 512 represents that the prediction is performed by filtering the pixels of the neighboring block in consideration of the direction of the prediction mode, the reference pixel composing unit 516 generates the reference pixel by filtering the pixels of the neighboring block in consideration of the direction of the prediction mode.

When the reference pixel composing unit 516 generates the reference pixel to be used for the predicted block by using the filter according to the direction of the prediction mode as described above, various types of filters may be used. As an example, a weighted average may be used for a filter formula as expressed in Equation 1 below.

$$A_N = (A_0 \times \alpha + A_1 \times \beta)/(\alpha+\beta) \qquad \text{Equation 1}$$

In Equation 1, $A_0$ and $A_1$ are a pixel in a first row and a pixel of a second low located in the direction of the vertical mode, respectively, and α and β denote respective weights to be multiplied by $A_0$ and $A_1$. $A_N$ denotes a reference pixel to be used for prediction, which is generated by using the weighted average as Equation 1. The number of pixels used for the weighted average is 2 in Equation 1. However, the number of pixels is merely exemplary, and a plurality of pixels may be used when generating the reference pixel for prediction of the target block. In addition, an equation used for filtering may be also different according to prediction modes. In addition, a filtering method having encoding efficiency may be used among various methods without limitation of filtering methods for each prediction mode.

Meanwhile, when the method for composing a reference pixel is selected, the prediction mode selection unit 512 includes, in prediction mode information, at least one among reference pixel identification information (for example, information representing whether filtering is performed to generate reference pixels) representing which reference pixel is used for encoding for each block, filter information representing which filter is used when several filters are used, and weight information about a weight used for a filter, and transmits the prediction mode information to the encoding unit 560.

The intra prediction unit 518 receives information about reference pixels from the reference pixel composing unit 516 and generates the predicted block according to the prediction mode selected by the prediction mode selection unit 512 by using the received information about reference pixels.

Meanwhile, a video encoded into a bitstream by the video encoding apparatus 500 may be transmitted in real time or non-real time to a video decoding apparatus, which will be described below, through wired/wireless communication networks such as the Internet, wireless personal area network (WPAN), wireless local area network (WLAN), WiBro (wireless broadband, aka WiMax) network, mobile communication network and the like or through communication interfaces such as a cable, a universal serial bus (USB) and the like, and thus decoded, reconstructed and reproduced as the video in a video decoding apparatus.

On the other hand, the prediction mode selection unit 512 may select the optimal prediction mode for each macroblock, wherein a macro block is a processing unit in image encoding. The prediction mode selection unit 512 may generate, for each macroblock, a reference pixel identification flag representing whether all subblocks of a corresponding macroblock use the adjacent pixels of the current block as the reference pixels of the intra prediction, or uses the pixels generated by filtering the adjacent pixels in consideration of the direction of the intra prediction mode.

In addition, the prediction mode selection unit 512 selects the optimal prediction mode in unit of a subblock, and generates the reference pixel identification flag in unit of a subblock. Herein, the reference pixel identification flag represents whether the adjacent pixels of the current block are used as the reference pixels, or the pixels generated by filtering the adjacent pixels in consideration of the direction of the intra prediction mode are used as the reference pixels.

When a difference between a first reference pixel including the adjacent pixels of a current block and a second reference pixel generated by filtering the adjacent pixels in consideration of the direction of the intra prediction mode is smaller than a predetermined value, the prediction mode selection unit 512 may omit the generation of the reference pixel identification flag. In this case, the reference pixel composing unit 516 may generate the first reference pixel or the second reference pixel as the reference pixel. That is, the prediction mode selection unit 512 may consider the characteristics of the neighboring block, which filtering is performed on and the reference pixel is extracted from, before selecting a prediction mode which applies a filter to pixels of the neighboring block in consideration of the direction of the prediction mode and transmitting information representing that the prediction mode uses the filter to the reference pixel composing unit 516. That is, when the pixels of a relevant neighboring block are similar to the adjacent pixels located at the boundary of the target block, and therefore, there is no great difference between the adjacent pixels and pixels generated upon application of the filter. In this case, the reference pixel identification information representing which encoding is used may be omitted.

Figure 7:
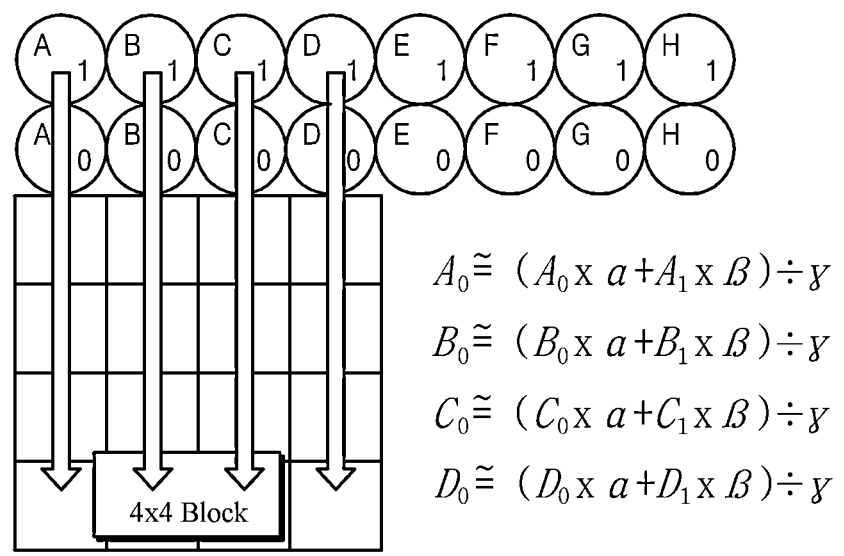
FIG. 7 is an exemplary diagram of filtering results in a case where encoding identification information is omitted according to at least one embodiment of the present disclosure.

FIG. 7 is an exemplary diagram of filtering results in a case where encoding identification information is omitted.

In FIG. 7, in a case where the prediction mode is a vertical mode, when pixel values generated by multiplying a pixel of a first row and a pixel of a second row by weights respectively are similar to the values of pixels located at the boundary of the target block or are smaller than a predetermined threshold, encoding may be performed by using an existing method, which uses the boundary pixels of the neighboring block, without transmitting reference pixel identification information, or may be performed by using a new method. When the video encoding apparatus shares information about the encoding method to be performed with the video decoding apparatus, or the encoding identification information is omitted by transmitting information in units of pictures, slices, or blocks, it is possible to know the method to be used. In this case, the number of pixels satisfying the condition (threshold condition) may be 1 or more when the values in the two cases described above are similar to each other or smaller than the threshold. When the number of pixels satisfying the threshold condition is greater than a predetermined number, a known method using the adjacent pixels of the neighboring block may be performed for encoding without transmitting the reference pixel identification information. The number of pixels satisfying the threshold condition may vary according to embodiments. The number of pixels satisfying the threshold condition may be determined in the initial stage of encoding, or may be determined and transmitted for each picture.

The threshold determining the difference between pixel values in the two cases described above may also be set variously. The threshold may vary according to block sizes or characteristics of the neighboring block. The threshold may be also set in the initial stage of encoding, or may be determined and transmitted for each picture. The reference pixel composing unit 516 may transmit information about the threshold to the encoding unit 560. The encoding unit 560 may transform the information about the threshold to the bitstream and transmit the same to the video decoding apparatus.

When the intra prediction mode of the neighboring block located in the direction of the intra prediction mode of the current block is identical to the intra prediction mode of the current block, the prediction mode selection unit 512 may omit the generation of the reference pixel identification flag. In this case, the reference pixel composing unit 516 may generate the reference pixel by using the first reference pixel including the adjacent pixels of the current block or the second reference pixel generated by filtering the adjacent pixels in consideration of the direction of the intra prediction mode. For example, in the case where the intra prediction mode of the current block is the vertical mode and the intra prediction mod of the reference block located in the upper portion of the current block is the vertical mode, the intra prediction mode of the neighboring block is identical to the intra prediction mode of the current block, omitting the generation of the reference pixel identification flag. Although the vertical mode is taken as an example, the present disclosure is not limited thereto. Determination as to whether the intra prediction mode of the neighboring block is identical to the intra prediction mode of the current block may be different according to respective intra prediction modes (except for the DC mode having no direction).

In at least another embodiment, the prediction unit 510 may generate the predicted block by using the pixels of the neighboring block adjacent to the current block according to a predetermined condition in macroblock unit, or generate the predicted block by selectively using the reference pixel generated by filtering pixels of the neighboring block adjacent to the current block or the pixels of the neighboring block according to the direction of the prediction mode. Herein, the predetermined condition is prearranged with the video decoding apparatus, and may be input from the outside.

In this case, when the predetermined condition means "use of known methods", the prediction unit 510 selects the optimal prediction mode by comparing the encoding costs of prediction modes including the intra prediction mode for using the adjacent pixel of the current block as the reference pixel. When the predetermined condition means "use of adaptive methods", the prediction unit 510 selects the optimal prediction mode by comparing the encoding costs of prediction modes including the intra prediction mode for using the adjacent pixel of the current block as the reference pixel and the intra prediction mode for using the pixel generated by filtering the adjacent pixels in consideration of the direction of the intra prediction mode as the reference pixel. The prediction unit 510 may generate the predicted block according to the prediction mode using the prediction mode selection unit 512 for generating a filtering condition flag corresponding to the predetermined condition, the reference pixel composing unit 516 for generating the reference pixel according to the prediction mode, and the reference pixel received from the reference pixel composing unit 516.

In addition, in at least another embodiment, the prediction mode selection unit 512 may select the optimal prediction mode for each subblock unit, and generate the reference pixel identification flag representing whether the adjacent pixel of the current block is used as the reference pixel or whether the pixel generated by filtering the adjacent pixel in consideration of the direction of the intra prediction mode is used as the reference pixel, for each subblock unit. In addition, when the difference between the first reference pixel including the adjacent pixels of the current block and the second reference pixel generated by filtering the adjacent pixels in consideration of the direction of the intra prediction mode is smaller than the predetermined value, the prediction mode selection unit 512 may omit the generation of the reference pixel identification flag. In this case, the reference pixel composing unit 516 may generate the reference pixel by using the first reference pixel or the second reference pixel. When the intra prediction mode of a neighboring block located in the direction of the intra prediction mode of a current block is identical to the intra prediction mode of the current block, the prediction mode selection unit 512 may omit the generation of the reference pixel identification flag. In this case, the reference pixel composing unit 516 may generate the reference pixel using the first reference pixel including the adjacent pixels of the current block or the second reference pixel generated by filtering the adjacent pixels in consideration of the direction of the intra prediction mode.

Figure 8:
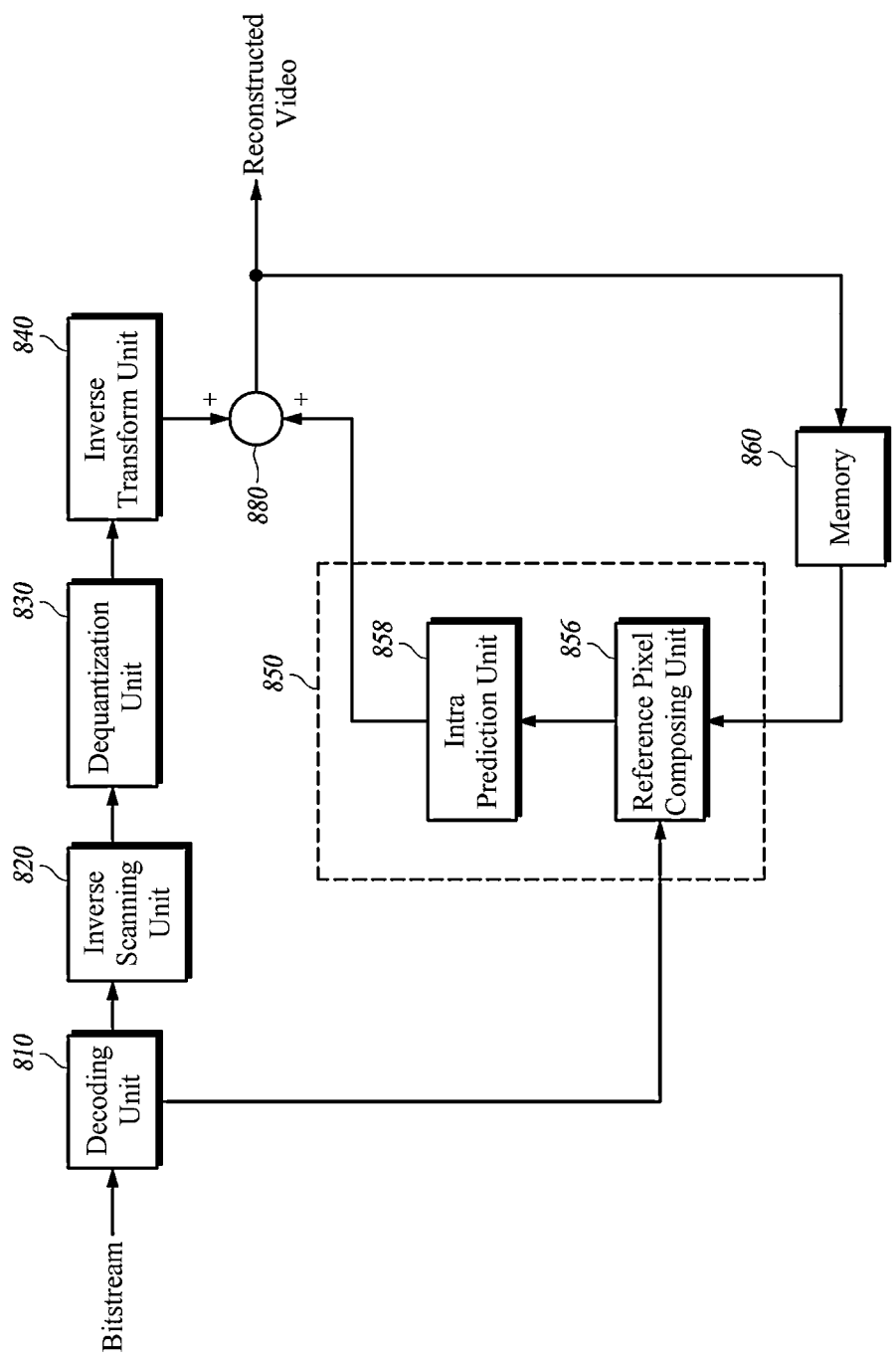
FIG. 8 is a schematic block diagram of a configuration of a video decoding apparatus according to at least one embodiment of the present disclosure.

FIG. 8 is a schematic block diagram of a configuration of a video decoding apparatus 800 according to at least one embodiment of the present disclosure.

The video decoding apparatus 800 according to at least one embodiment of the present disclosure may include a decoding unit 810, an inverse scanning unit 820, a dequantization unit 830, an inverse transform unit 840, a prediction unit 850, a memory 860, and an addition unit 880.

The decoding unit 810 receives encoded data, reconstructs an intra prediction mode by decoding a bitstream of the encoded data, extracts a quantized frequency coefficient string to reconstruct a quantized transformed residual block, and transmits the string to the inverse scanning unit 820. The inverse scanning unit 820 generates a residual block having quantized frequency coefficients by inversely scanning the quantized frequency coefficient according to mode information. When each residual block is generated by performing inverse scanning according to the mode information, the inverse scanning unit 820 transmits the generated residual block to the dequantization unit 830. On the other hand, the function of the inverse scanning unit 820 may be integrated into the decoding unit 810.

The dequantization unit 830 reconstructs a frequency coefficient block by dequantizing the decoded quantization frequency coefficients. That is, the dequantization unit 830 dequantizes the quantized transformed residual block to reconstruct a transformed residual block.

The inverse transform unit 840 reconstructs the residual block by inversely transforming the reconstructed frequency coefficient block. That is, the inverse transform unit 840 inversely transforms the transformed residual block to reconstruct a residual block Since the dequantization unit 830 and the inverse transform unit 840 perform the functions identical or similar to those of the dequantization unit 170 and the inverse transform unit 180 described above with reference to FIG. 1, a detailed description thereof will be omitted.

The prediction unit 850 generates the predicted block by selectively using the pixels of the neighboring block adjacent to the current block or the reference pixel generated by filtering the pixels of the neighboring block of the current block according to the direction of the intra prediction mode.

The addition unit 880 reconstructs a target block by adding the predicted block predicted by the prediction unit 850 to the residual block reconstructed by the inverse transform unit 840. The reconstructed target block is stored in the memory 860, and may be used as a reference picture when a next block of the target block or other blocks are reconstructed.

Although not shown in FIG. 8, a deblocking filter unit (not shown) may be further connected between the memory 860 and the addition unit 880. The deblocking filter unit performs deblocking filtering on the target block reconstructed by the addition unit 880. Herein, the deblocking filtering refers to an operation for reducing block distortion generated during the encoding of the video in unit of block. The deblocking filter may be applied to a block boundary and a macroblock boundary, may be applied only to a macroblock boundary, or may not be used.

The prediction unit 850 may include a reference pixel composing unit 856 and an intra prediction unit 858.

If it is determined that the decoding unit 810 generates the reference pixel by using the intra prediction mode and the reconstructed reference pixel identification flag, the reference pixel composing unit 856 generates the reference pixel by filtering the pixels of the neighboring block adjacent to the current block or the pixels of the neighboring block according to the direction of the intra prediction mode, according to the value of the reference pixel identification flag. If it is determined that the decoding unit 810 generates the reference pixel by using the intra prediction mode without using the reference pixel identification flag, the reference pixel composing unit 856 generates the reference pixel to be used for generation of the predicted block by using the reference pixel prearranged with the video encoding apparatus among the pixels of the neighboring block adjacent to the current block or the reference pixel generated by filtering the pixels of the neighboring block according to the direction of the intra prediction mode.

The intra prediction unit 858 receives information about the reference pixel from the reference pixel composing unit 856 and generates the predicted block according to the received prediction mode by using the received information about the reference pixel.

The decoding unit 810 reconstructs the reference pixel identification flag for each macroblock from encoded data. In this case, the prediction unit 850 may generate, for all subblocks of a corresponding macroblock, the predicted block by selectively using the pixels of the neighboring block adjacent to the current block according to the value of the reference pixel identification flag, or the reference pixel generated by filtering the pixels of the neighboring block of the current block according to the direction of the intra prediction mode.

The decoding unit 810 reconstructs the reference pixel identification flag for each subblock from encoded data. In this case, the prediction unit 850 generates the predicted block by selectively using the pixels of the neighboring block adjacent to the current block according to the value of the reference pixel identification flag reconstructed for a relevant subblock, or the reference pixel generated by filtering the pixel of the neighboring block of the current block according to the direction of the intra prediction mode.

On the other hand, when the difference between the first reference pixel including the adjacent pixels of the current block and the second reference pixel formed by filtering the adjacent pixels in consideration of the direction of the intra prediction mode is larger than a threshold, the decoding unit 810 reconstructs the reference pixel identification flag for each subblock from the encoded data. In this case, the prediction unit 850 may generate the predicted block by selectively using the pixels of the neighboring block adjacent to the current block according to the value of the reference pixel identification flag for a relevant subblock, or the reference pixel generated by filtering the pixels of the neighboring block of the current block according to the direction of the intra prediction mode.

When the difference between the first reference pixel and the second reference pixel is equal to or smaller than the threshold, the decoding unit 810 omits the operation for reconstructing the reference pixel identification flag for each subblock from the encoded data. In this case, the prediction unit 850 generates the predicted block using the first reference pixel or the second reference pixel. Herein, whether to use the first reference pixel or the second reference pixel may be prearranged with the video encoding apparatus, and it is possible to know the method to be used in the case where encoding identification information is omitted by transmitting information in units of sequences, pictures, slices, and blocks.

If the intra prediction mode of the neighboring block located in the direction of the intra prediction mode of the current block is identical to the intra prediction mode of the current block, the prediction unit 850 may generate the predicted block using the first reference pixel including the adjacent pixels of the current block and the second reference pixel composed by filtering the pixels of the neighboring block in consideration of the direction of the intra prediction mode. In this case, whether to use the first reference pixel or the second reference pixel may be prearranged with the video encoding apparatus.

On the other hand, if the intra prediction mode of the neighboring block located in the direction of the intra prediction mode of the current block is not identical to the intra prediction mode of the current block, the decoding unit 810 reconstructs the reference pixel identification flag for each subblock from the encoded data. In this case, the prediction unit 850 may generate the predicted block by using the first reference pixel or the second reference pixel according to the value of the reconstructed reference pixel identification flag.

In this case, the encoded data may include the filtering condition flag. The decoding unit 810 may receive the encoded data and reconstruct the intra prediction mode and the residual block with the filtering condition flag included therein.

In this case, the prediction unit 850 may generate the predicted block by using the pixels of the neighboring block adjacent to the current block with the intra prediction mode according to the value of the filtering condition flag, or generate the predicted block by selectively using pixels of the neighboring block of the current block or the reference pixel generated by filtering the pixels of the neighboring block of the current block according to the direction of the intra prediction mode.

In this case, when the filtering condition flag means "use of known methods", the prediction unit 850 may generate the predicted block by using the pixels of the neighboring block adjacent to the current block in the intra prediction mode. When the filtering condition flag means "use of adaptive methods", the prediction unit 850 may generate the predicted block by selectively using the pixel of the neighboring block adjacent to the current block in the intra prediction mode, or the reference pixel generated by filtering the pixels of the neighboring block according to the direction of the intra prediction mode.

In addition, when the filtering condition flag means "use of adaptive method", the decoding unit 810 may reconstruct the reference pixel identification flag for each macroblock from the encoded data, and the prediction unit 850 may generate the predicted block according to the value of the reference pixel identification flag for all subblocks of a relevant macroblock.

In addition, when the filtering condition flag means "use of adaptive method", the decoding unit 810 may reconstruct the reference pixel identification flag for each subblock from the encoded data, and the prediction unit 850 may generate the predicted block according to the value of the reference pixel identification flag for a relevant subblock.

In the case where the filtering condition flag means "use of adaptive method, when the difference between the first reference pixel including the adjacent pixels of the current block and the second reference pixel composed by filtering the adjacent pixels of the current block in consideration of the direction of the intra prediction mode is larger than the threshold, the decoding unit 810 reconstructs the reference pixel identification flag for each subblock from the encoded data. In this case, the prediction unit 850 may generate the predicted block by selectively using the pixel of the neighboring block adjacent to the current block according to the value of the reference pixel identification flag for a relevant subblock, or the reference pixel generated by filtering the pixels of the neighboring block according to the direction of the intra prediction mode. When the difference between the first reference pixel and the second reference pixel is equal to or smaller than the threshold, the decoding unit 810 does not reconstruct the reference pixel identification flag for each subblock from the encoded data. In this case, the prediction unit 850 may generate the predicted block using the first reference pixel or the second reference pixel. In this case, whether to use the first reference pixel or the second reference pixel may be also prearranged with the video encoding apparatus.

In the case where the filtering condition flag means "use of adaptive method, when the intra prediction mode of the neighboring block located in the direction of the intra prediction mode of the current block is identical to the intra prediction mode of the current block, the prediction unit 850 may the predicted block using the first reference pixel including the adjacent pixels of the current block and the second reference pixel composed by filtering the pixels of the neighboring block in consideration of the direction of the intra prediction mode. On the other hand, if the intra prediction mode of the neighboring block located in the direction of the intra prediction mode of the current block is not identical to the intra prediction mode of the current block, the decoding unit may reconstruct the reference pixel identification flag for each subblock from the encoded data. In this case, the prediction unit 850 may generate the predicted block using the first reference pixel or the second reference pixel according to the value of the reconstructed reference pixel identification flag. In this case, whether to use the first reference pixel or the second reference pixel may be also prearranged with the video encoding apparatus.

Figure 9:
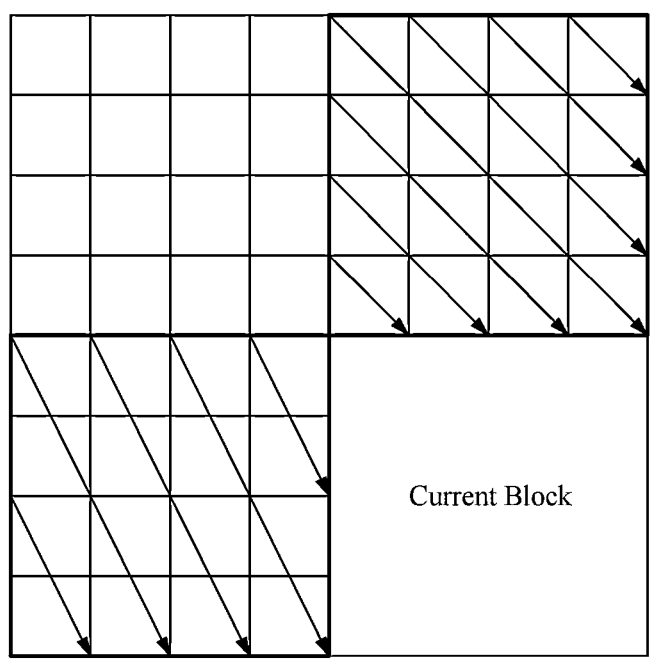
FIG. 9 is a schematic diagram of an intra prediction mode of a neighboring block of a current block according to at least one embodiment of the present disclosure.

FIG. 9 is a schematic diagram of the intra prediction mode of a neighboring block of a current block.

In FIG. 5, the prediction unit 510 may generate the predicted block by using the reference pixel generated by filtering the pixels of the neighboring block according to the direction of the intra prediction mode of the neighboring block adjacent to the current block.

Referring to FIG. 9, the intra prediction mode of the left block of the current block is the vertical-right mode and the intra prediction mode of the upper block of the current block is the diagonal down-right mode, the reference pixel is generated by filtering the pixels of the left block adjacent to the current block in a vertical-right direction and filtering the pixels of the upper block adjacent to the current block in a diagonal down-right direction.

In this case, the prediction mode selection unit 512 selects an optimal prediction mode by comparing the encoding costs of the intra prediction modes of the current block by using the reference pixel generated by filtering the pixels of the neighboring block according to the direction of the intra prediction mode of the neighboring block adjacent to the current block.

In this case, the reference pixel composing unit 516 generates the reference pixel according to the selected optimal prediction mode, and the intra prediction unit 518 receives the generated reference pixel from the reference pixel composing unit 516 and generates the predicted block according to the optimal prediction mode. If the intra prediction mode of the neighboring block is the DC mode, the reference pixel is generated without performing filtering according to a known method.

On the other hand, the prediction unit 850 of the video decoding apparatus 800 according to at least one embodiment of the present disclosure in FIG. 8 generates the predicted block according to the intra prediction mode reconstructed by the decoding unit 810 using the reference pixel generated by filtering the pixels of the neighboring block according to the direction of the intra prediction mode of the neighboring block. That is, referring to FIG. 9, the intra prediction mode of the left block of the current block is the vertical-right mode and the intra prediction mode of the upper block of the current block is the diagonal down-right mode, the reference pixel is generated by filtering the pixels of the left block adjacent to the current block in a vertical-right direction and filtering the pixels of the upper block adjacent to the current block in a diagonal down-right direction.

In at least one embodiment according to the present disclosure, if the intra prediction mode of the neighboring block is the DC mode, the reference pixel is generated without performing filtering according to a known method.

The video encoding/decoding apparatus according to at least one embodiment of the present disclosure can be implemented by connecting a bitstream output terminal of the video encoding apparatus 500 of FIG. 5 to a bitstream input terminal of the video decoding apparatus 800 of FIG. 8.

The video encoding/decoding apparatus according to at least one embodiment of the present disclosure a video encoder and a video decoder. The video encoder generates a predicted block by selectively using pixels of a neighboring block adjacent to a current block or a reference pixel generated by filtering pixels of the neighboring block according to a prediction mode or by using a reference pixel generated by filtering the pixels of the neighboring block according to a direction of an intra prediction mode of the neighboring block of the current block, generates a residual block by subtracting the predicted block from the current block, and performs encoding by transforming and quantizing the residual block. The video decoder receives encoded data, reconstructs the intra prediction mode and the residual block, reconstructs the residual block by dequantizing and inversely transforming the residual block, generates a predicted block by selectively using pixels of the neighboring block adjacent to the current block or a reference pixel generated by filtering the pixels of the neighboring block according to the intra prediction mode, or by using a reference pixel generated by filtering pixels of the neighboring block according to the direction of the intra prediction mode of the neighboring block adjacent to the current block, and reconstructs the current block by adding the reconstructed residual block to the predicted block.

In this case, the video encoder can be implemented using the video encoding apparatus 500 according to at least one embodiment of the present disclosure and the video decoder can be implemented using the video decoding apparatus 800 according to at least one embodiment of the present disclosure.

A video encoding method according to at least one embodiment of the present disclosure includes a prediction step (S910), a subtraction step (S920), a transform step (S930), a quantization step (S940) and an encoding step (S950). In the prediction step (S910), a predicted block is generated by selectively using pixels of a neighboring block adjacent to a current block or a reference pixel generated by filtering the pixels of the neighboring block according to an intra prediction mode of the current block. In the subtraction step (S920), a residual block is generated by subtracting the predicted block from the current block. In the transform step (S930), the residual block is transformed. In the quantization step (S940), the transformed residual block is quantized to generate the quantized residual block. In the encoding step (S950), the quantized residual block is encoded.

Herein, since the prediction step (S910), the subtraction step (S920), the transform step (S930), the quantization step (S940), and the encoding step (S950) correspond to the operations of the prediction unit 510, the subtraction unit 520, the transform unit 530, the quantization unit 540, and the encoding unit 560, detailed descriptions thereof will be omitted.

A video encoding method according to at least another embodiment of the present disclosure includes a prediction step (S1010), a subtraction step (S1020), a transform step (S1030), a quantization step (S1040) and an encoding step (S1050). In the prediction step (S1010), a predicted block is generated by using pixels of a neighboring block adjacent to a current block, or is generated by selectively using pixels of the neighboring block adjacent to the current block or a reference pixel generated by filtering the pixels of the neighboring block according to an intra prediction mode of the current block, according to a predetermined condition for each macroblock. In the subtraction step (S1020), a residual block is generated by subtracting the predicted block from the current block. In the transform step (S1030), the residual block is transformed. In the quantization step (S1040), the transformed residual block is quantized to generate the quantized residual block. In the encoding step (S1050), the quantized residual block is encoded.

Herein, since the prediction step (S1010), the subtraction step (S1020), the transform step (S1030), the quantization step (S1040), and the encoding step (S1050) correspond to the operations of the prediction unit 510, the subtraction unit 520, the transform unit 530, the quantization unit 540, and the encoding unit 560, respectively, detailed descriptions thereof will be omitted.

A video encoding method according to at least another embodiment of the present disclosure includes a prediction step (S1310), a subtraction step (S1320), a transform step (S1330), a quantization step (S1340) and an encoding step (S1350). In the prediction step (S1310), a predicted block is generated by using a reference pixel generated by filtering pixels of a neighboring block adjacent to a current block according to a direction of an intra prediction mode of the neighboring block. In the subtraction step (S1320), a residual block is generated by subtracting the predicted block from the current block. In the transform step (S1330), the residual block is transformed. In the quantization step (S1340), the transformed residual block is quantized to generate the quantized residual block. In the encoding step (S1350), the quantized residual block is encoded.

Herein, since the prediction step (S1310), the subtraction step (S1320), the transform step (S1330), the quantization step (S1340), and the encoding step (S1350) correspond to the operations of the prediction unit 510, the subtraction unit 520, the transform unit 530, the quantization unit 540, and the encoding unit 560, respectively, detailed descriptions thereof will be omitted.

A video decoding method according to at least one embodiment of the present disclosure includes a decoding step (S1110), a dequantization step (S1120), an inverse transform step (S1130), a prediction step (S1140) and an addition step (S1150). In the decoding step (S1110), encoded data is received and an intra prediction mode and a residual block are reconstructed. In the dequantization step (S1120), the residual block is dequantized. In the inverse transform step (S1130), the dequantized residual block is inversely transformed to reconstruct the residual block. In the prediction step (S1140), a predicted block is generated by selectively using pixels of a neighboring block adjacent to a current block or a reference pixel generated by filtering pixels of the neighboring block according to the intra prediction mode. In the addition step (S1150), the current block is reconstructed by adding the reconstructed residual block to the predicted block.

Herein, since the decoding step (S1110), the dequantization step (S1120), the inverse transform step (S1130), the prediction step (S1140) and the addition step (S1150) correspond to the operations of the decoding unit 810, the dequantization unit 830, the inverse transform unit 840, the prediction unit 850 and the addition unit 880, respectively, detailed descriptions thereof will be omitted.

A video decoding method according to at least another embodiment of the present disclosure includes a decoding step (S1210), a dequantization step (S1220), an inverse transform step (S1230), a prediction step (S1240) and an addition step (S1250). In the decoding step (S1210), encoded data is received, and an intra prediction mode, a filtering condition flag and a residual block are reconstructed. In the dequantization step (S1220), the residual block is dequantized. In the inverse transform step (S1230), the dequantized residual block is inversely transformed to reconstruct the residual block. In the prediction step (S1240), a predicted block is generated by using pixels of a neighboring block adjacent to a current block according to the intra prediction mode, or the predicted block is generated by selectively using the pixels of the neighboring block or a reference pixel generated by filtering pixels of the neighboring block according to the intra prediction mode, according to a value of the filtering condition flag. In the addition step (S1250), the current block is reconstructed by adding the reconstructed residual block to the predicted block.

Herein, since the decoding step (S1210), the dequantization step (S1220), the inverse transform step (S1230), the prediction step (S1240) and the addition step (S1250) correspond to the operations of the decoding unit 810, the dequantization unit 830, the inverse transform unit 840, the prediction unit 850 and the addition unit 880, respectively, detailed descriptions thereof will be omitted.

A video decoding method according to yet at least another embodiment of the present disclosure includes a decoding step (S1410), a dequantization step (S1420), an inverse transform step (S1430), a prediction step (S1440) and an addition step (S1450). In the decoding step (S1410), encoded data is received and an intra prediction mode and a residual block are reconstructed. In the dequantization step (S1420), the residual block is dequantized. In the inverse transform step (S1430), the dequantized residual block is inversely transformed to reconstruct the residual block. In the prediction step (S1440), a predicted block according to the reconstructed intra prediction mode is generated by using pixels of a neighboring block adjacent to a current block or a reference pixel generated by filtering pixels of the neighboring block according to a direction of the intra prediction mode of the neighboring block. In the addition step (S1450), the current block is reconstructed by adding the reconstructed residual block to the predicted block.

Herein, since the decoding step (S1410), the dequantization step (S1420), the inverse transform step (S1430), the prediction step (S1440) and the addition step (S1450) correspond to the operations of the decoding unit 810, the dequantization unit 830, the inverse transform unit 840, the prediction unit 850 and the addition unit 880, respectively, detailed descriptions thereof will be omitted.

The video encoding/decoding method according to one or more embodiments of the present disclosure can be implemented by integrating the video encoding method according to at least one embodiment of the present disclosure and the video decoding method according to at least one embodiments of the present disclosure.

A video encoding/decoding method according to at least one embodiment of the present disclosure includes a video encoding step and a video decoding step. In the video encoding step, a predicted block is generated by selectively using pixels of a neighboring block adjacent to a current block or a reference pixel generated by filtering pixels of the neighboring block according to a prediction mode or by using a reference pixel generated by filtering the pixels of the neighboring block according to a direction of an intra prediction mode of the neighboring block of the current block, a residual block is generated by subtracting the predicted block from the current block and encoding is performed by transforming and quantizing the residual block. In the video decoding step, a predicted block is generated by selectively using pixels of a neighboring block adjacent to a current block or a reference pixel generated by filtering pixels of the neighboring block according to a prediction mode or by using a reference pixel generated by filtering the pixels of the neighboring block according to a direction of an intra prediction mode of the neighboring block of the current block, a residual block is generated by subtracting the predicted block from the current block and encoding is performed by transforming and quantizing the residual block.

As described above, the present disclosure is highly useful for application in the fields of video encoding and decoding. It is possible to increase prediction accuracy and improve encoding performance by generating a predicted pixel or block by using a reference pixel generated by applying a filter to the pixels of a neighboring block in consideration of the direction of a prediction mode for prediction of a current block. The present disclosure as described above can improve prediction accuracy and in turn enhance encoding efficiency by generating a predicted pixel or block by using a reference pixel generated by applying a filter to pixels of a neighboring block when pixels of a block to be currently encoded or decoded is intra predicted. In addition, the present disclosure can reduce quantization error of reference pixels adjacent to a current block to improve prediction accuracy by performing intra prediction by using a reference pixel filtered in consideration of the direction of the intra mode of the neighboring block. Moreover, the present disclosure can decode an encoded bitstream by using a method corresponding to an encoding method.

In the description above, although all of the components of the embodiments of the present disclosure may have been explained as assembled or operatively connected as a unit, one of ordinary skill would understand the present disclosure is not limited to such embodiments. Rather, within some embodiments of the present disclosure, the respective components are selectively and operatively combined in any number of ways. Although exemplary embodiments of the present disclosure have been described for illustrative purposes, those skilled in the art will appreciate that various modifications, additions and substitutions are possible, without departing from various characteristics of the disclosure. Therefore, exemplary embodiments of the present disclosure have been described for the sake of brevity and clarity. Accordingly, one of ordinary skill would understand the scope of the claimed invention is not limited by the explicitly described above embodiments but by the claims and equivalents thereof.

The invention claimed is:

1. A video encoding apparatus, comprising:
a prediction unit configured to:
select an intra prediction mode of a current block among a plurality of intra prediction modes;
determine which one of (i) pixels of one or more neighboring blocks of the current block and (ii) pixels generated by filtering the pixels of the one or more neighboring blocks is to be used as reference pixels for the selected intra prediction mode; and
generate a predicted block of the current block, by predicting pixel values of the current block from the reference pixels, according to the selected intra prediction mode of the current block;
determine whether a difference between the pixels of the one or more neighboring blocks and the pixels generated by filtering is larger than a threshold;
in response to a determination that the difference is larger than the threshold, generate a reference pixel identification flag which represents which one of the pixels of one or more neighboring blocks of the current block and the pixels generated by filtering is to be used as reference pixels;
a subtraction unit configured to generate a residual block by subtracting the predicted block from the current block;
a transform unit configured to transform the residual block;
a quantization unit configured to quantize the transformed residual block to generate the quantized residual block; and
an encoding unit configured to encode the quantized transformed residual block.

2. The video encoding apparatus of claim 1, wherein the filtering the pixels of the one or more neighboring blocks is performed according to a prediction direction of intra prediction modes of the one or more neighboring blocks.

3. The video encoding apparatus of claim 1, wherein the filtering the pixels of the one or more neighboring blocks is performed according to a prediction direction of the selected intra prediction mode.

4. The video encoding apparatus of claim 3, wherein the filtering is performed by using first pixels in the one or more neighboring blocks, and the first pixels are different from the pixels of the one or more neighboring blocks.

5. A video decoding apparatus, comprising:
a decoding unit configured to reconstruct an intra prediction mode of a current block by decoding a bitstream of encoded data;
a dequantization unit configured to dequantize a quantized transformed residual block included in the decoded bitstream to reconstruct a transformed residual block;
an inverse transform unit configured to inversely transform the transformed residual block to reconstruct a residual block;
a prediction unit configured to:
determine which one of (i) pixels of one or more neighboring blocks of the current block and (ii) pixels generated by filtering the pixels of the one or more neighboring blocks is to be used as reference pixels for the intra prediction mode; and
generate a predicted block of the current block, by predicting pixel values of the current block from the reference pixels, according to the intra prediction mode; and
an addition unit configured to add the reconstructed residual block and the predicted block to reconstruct the current block, wherein, when a difference between the pixels of the one or more neighboring blocks and the pixels generated by filtering is larger than a threshold, the decoding unit reconstructs a reference pixel identification flag for the current block or an image area which includes the current block from the encoded data, and the prediction unit performs the determining based on a value of the reference pixel identification flag.

6. The video decoding apparatus of claim 5, wherein the prediction unit comprises:
a reference pixel composing unit configured to generate the reference pixels in response to the determining; and
an intra prediction unit configured to receive the reference pixels from the reference pixel composing unit and generate the predicted block according to the intra prediction mode by using the received reference pixels.

7. A video decoding apparatus, comprising:
a decoding unit configured to reconstruct an intra prediction mode of a current block by decoding a bitstream of encoded data;
a dequantization unit configured to dequantize a quantized transformed residual block included in the decoded bitstream to reconstruct a transformed residual block;
an inverse transform unit configured to inversely transform the transformed residual block to reconstruct a residual block;
a prediction unit configured to:
 determine which one of (i) pixels of one or more neighboring blocks of the current block and (ii) pixels generated by filtering the pixels of the one or more neighboring blocks is to be used as reference pixels for the intra prediction mode; and
 generate a predicted block of the current block, by predicting pixel values of the current block from the reference pixels, according to the intra prediction mode; and
an addition unit configured to add the reconstructed residual block and the predicted block to reconstruct the current block,
 wherein, when the intra prediction mode of the neighboring block located in the direction of the intra prediction mode of the current block is not identical to the intra prediction mode of the current block, the decoding unit reconstructs a reference pixel identification flag for the current block or an image area which includes the current block from the encoded data, and the prediction unit performs the determining based on a value of the reference pixel identification flag.

8. A video decoding method performed by a video decoding apparatus, comprising:
receiving encoded data and reconstructing an intra prediction mode of a current block;
dequantizing a quantized transformed residual block to reconstruct a transformed residual block;
inversely transforming the transformed residual block to reconstruct a residual block;
reconstructing a reference pixel identification flag for the current block or an image area which includes the current block from the encoded data, when a difference between the pixels of the one or more neighboring blocks and the pixels generated by filtering is larger than a threshold;
based on a value of the reference pixel identification flag, determine which one of (i) pixels of one or more neighboring blocks adjacent to the current block and (ii) pixels generated by filtering the pixels of the one or more neighboring blocks is to be used as reference pixels for the intra prediction mode; and
generating a predicted block of the current block by predicting pixel values of the current block from the reference pixels according to the intra prediction mode; and
reconstructing the current block by adding the reconstructed residual block to the predicted block.

9. The video decoding method of claim 8, wherein the generating of a predicted block comprises:
generating the reference pixels by filtering the adjacent pixels according to a prediction direction of the intra prediction mode; and
generating the predicted block according to the intra prediction mode by using the generated reference pixels.

* * * * *